(12) United States Patent
Torosian et al.

(10) Patent No.: US 9,103,496 B2
(45) Date of Patent: Aug. 11, 2015

(54) LIGHT CURTAIN WITH MACHINE SENSING

(71) Applicant: 167811 Canada Inc, Lachine (CA)

(72) Inventors: Jorge R. Torosian, Montreal (CA);
Fabian G. Picca, Pierrefonds (CA);
Eduardo S. Verberck, Saint-Lazare (CA)

(73) Assignee: 167811 Canada Inc., Quebec (CA)

( * ) Notice: Subject to any disclaimer, the term of this patent is extended or adjusted under 35 U.S.C. 154(b) by 313 days.

(21) Appl. No.: 13/663,236

(22) Filed: Oct. 29, 2012

(65) Prior Publication Data

US 2014/0117216 A1 May 1, 2014

(51) Int. Cl.
*F16P 3/14* (2006.01)
*G01V 8/20* (2006.01)

(52) U.S. Cl.
CPC .. *F16P 3/144* (2013.01); *G01V 8/20* (2013.01)

(58) Field of Classification Search
CPC .............. F16P 3/144; F16P 7/02; F16P 3/04; G01V 8/20
USPC .......... 250/221, 239; 340/555, 556, 557, 565; 356/23, 25, 32–35, 395–398
See application file for complete search history.

(56) References Cited

U.S. PATENT DOCUMENTS

| | | | |
|---|---|---|---|
| 5,235,217 A | | 8/1993 | Kirton |
| 7,286,895 B2 * | | 10/2007 | Krieg ........................... 700/177 |
| 2002/0104958 A1 | | 8/2002 | Fiessler |
| 2006/0138310 A1 | | 6/2006 | Krieg |

FOREIGN PATENT DOCUMENTS

| | | |
|---|---|---|
| WO | 97/25568 | 7/1997 |
| WO | 2006/135961 | 12/2006 |

OTHER PUBLICATIONS

Extended European Search Report which issued in connection with corresponding European Application No. 13184728.7 on Feb. 25, 2015.

* cited by examiner

*Primary Examiner* — Francis M Legasse, Jr.
*Assistant Examiner* — Don Williams
(74) *Attorney, Agent, or Firm* — Clark Hill PLC

(57) ABSTRACT

A light curtain for use with a machine, such as a press brake. The light curtain includes a controller which is communicatingly connected to a controller of the machine, and at least one presence detector which is connected to the controller of the light curtain. The light curtain also includes at least one sensor which is configured to sense position and/or speed of movement of a moveable part of the machine, in use, the controller of the light curtain receives feedback from the at least one presence detector as well as from the at least one sensor which is configured to sense position and/or speed of movement of the moveable part of a machine. The controller of the light curtain signals the controller of the machine to operate the machine based on the feedback which is received by the light curtain. Preferably, the at least one presence detector is sequentially programmable to effectively provide blanked-out sections, and the controller of the light curtain uses the at least one sensor to detect when the moveable part of the machine is moving through the blanked-out section, and cause the machine to slow down to a safer speed.

19 Claims, 3 Drawing Sheets

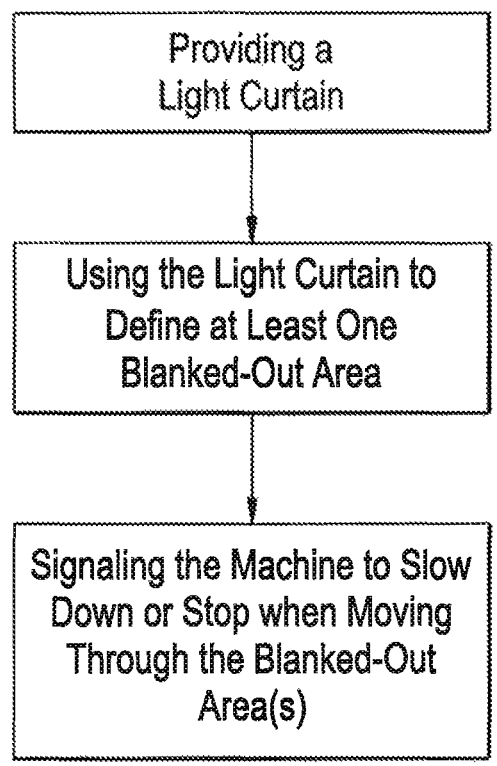

LIGHT CURTAIN WITH MACHINE SENSING

The present invention generally relates to light curtains, and more specifically relates to a light curtain which is configured to sense position and/or speed of movement of a moveable part of a machine, and cause the machine to be controlled based on what is sensed.

Light curtains are optical-electronic devices that are used in industrial settings to, for example, prevent a machine operator from getting hurt while operating the machine. Light curtains are typically used with machines such as, but not limited to, brake presses, winders and palletisers. Light curtains can be used instead of mechanical barriers and other types of traditional machine guarding, thereby working to increase the efficiency and productivity of the machines they guard.

A typical light curtain consists of two columns, a column consisting of light emitters and a column consisting of light receivers. The column of light emitters emits a plurality of light beams that are detected by the column of light receivers. The light beams effectively fan out across an area of the machine which is considered to be high risk with regard to possible injury to the operator. When the column of light receivers detects a break in the light beams while the machine is operating, the light curtain sends a stop signal to the controller of the machine, thereby causing the machine to stop moving and preventing possible injury to the operator.

Some types of machines cannot be adequately covered using a conventional, simple light curtain. For example, press brakes are machines designed to bend metal of different dimensions at various angles. A basic light curtain cannot provide adequate protection and is not practical for use with a press brake in many applications, because even during normal operation of the machine, with no risky interference by the operator, the part itself often breaks the light beams of the light curtain. In fact, the part may break some light beams of the light curtain in one bending step, and still other light beams of the light curtain in subsequent bending steps.

For complex applications such as this, there exists in the industry more complex light curtains, such as sequentially programmable beam-blank-out systems. These types of systems provide that the operator can program the light curtain so that certain light beams of the light curtain are blanked out at given times during a multiple step bending process. This prevents the part itself from breaking the light beams of the light curtain during the bending process, thereby allowing the machine to operate effectively. Although sequentially programmable beam-blank-out systems provide functionality which allows them to be used in relatively complex operations of a given machine, such as bending steps of a press brake machine, the fact that certain parts of the light curtain become blanked out during the process provides that a portion of the machine is left effectively unguarded during operation of the machine.

SUMMARY

An object of an embodiment of the present invention is to provide a light curtain which senses position and/or speed of movement of a moveable part of a machine during its operation, and then causes the machine to be controlled based on what is sensed.

Briefly, an embodiment of the present invention provides a light curtain configured for use with a machine. The light curtain comprises a controller which is communicatingly connected to the controller of the machine. The light curtain also comprises at least one presence detector which is connected to the controller of the light curtain. The at least one presence detector may comprise, for example, a plurality of light emitters and a plurality of light detectors, wherein the light emitters emit beams of light toward the light detectors. At least one machine sensor is also communicatingly connected to the controller of the light curtain, and is configured to sense position and/or speed of movement of a moveable part of the machine. The controller of the light curtain is configured to receive feedback from the at least one presence detector as well as from the at least one sensor which is configured to sense position and/or speed of movement of a moveable part of a machine, and the controller of the light curtain is configured to signal the controller of the machine to operate the machine based on the feedback which is received by the light curtain.

Another embodiment of the present invention provides a method of causing a machine to be controlled depending on what is sensed by a light curtain. The light curtain comprises a controller, at least one presence detector, and at least one sensor which is configured to sense motion and/or speed of motion of a movable part of the machine. The controller of the machine operates the machine, and while the machine is being operated, the controller of the light curtain receives feedback from the at least one presence detector as well as from the at least one sensor which is configured to sense motion and/or speed of motion of the movable part of the machine. The controller of the light curtain is configured to signal the controller of the machine to operate the machine based on the feedback which is received by the light curtain.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 3 is a block diagram of a method which is in accordance with an embodiment of the present invention.

DESCRIPTION OF ILLUSTRATED EMBODIMENTS

Figure 1:
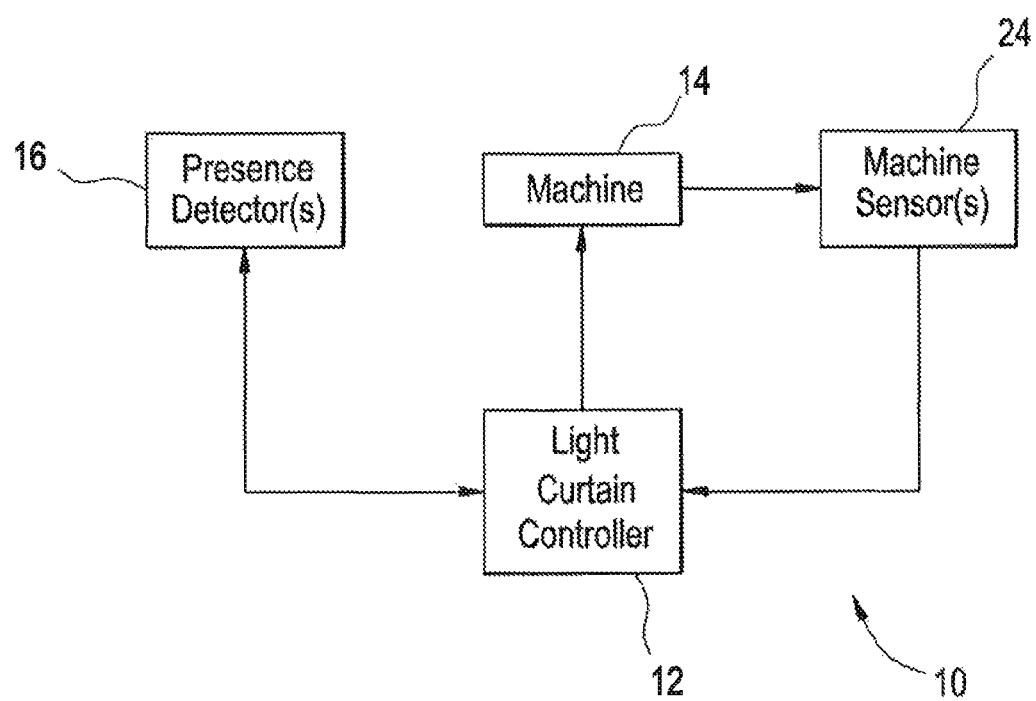
FIG. 1 is a block diagram of a light curtain which is in accordance with an embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

FIG. 1 is a block diagram of a light curtain 10 which is in accordance with an embodiment of the present invention. As shown, the light curtain 10 comprises a controller 12. The controller 12 may comprise, for example, a computer running computer readable code (i.e., software). The controller 12 is communicatingly connected to a machine 14, such as a press brake, winder or palletiser.

Figure 2:
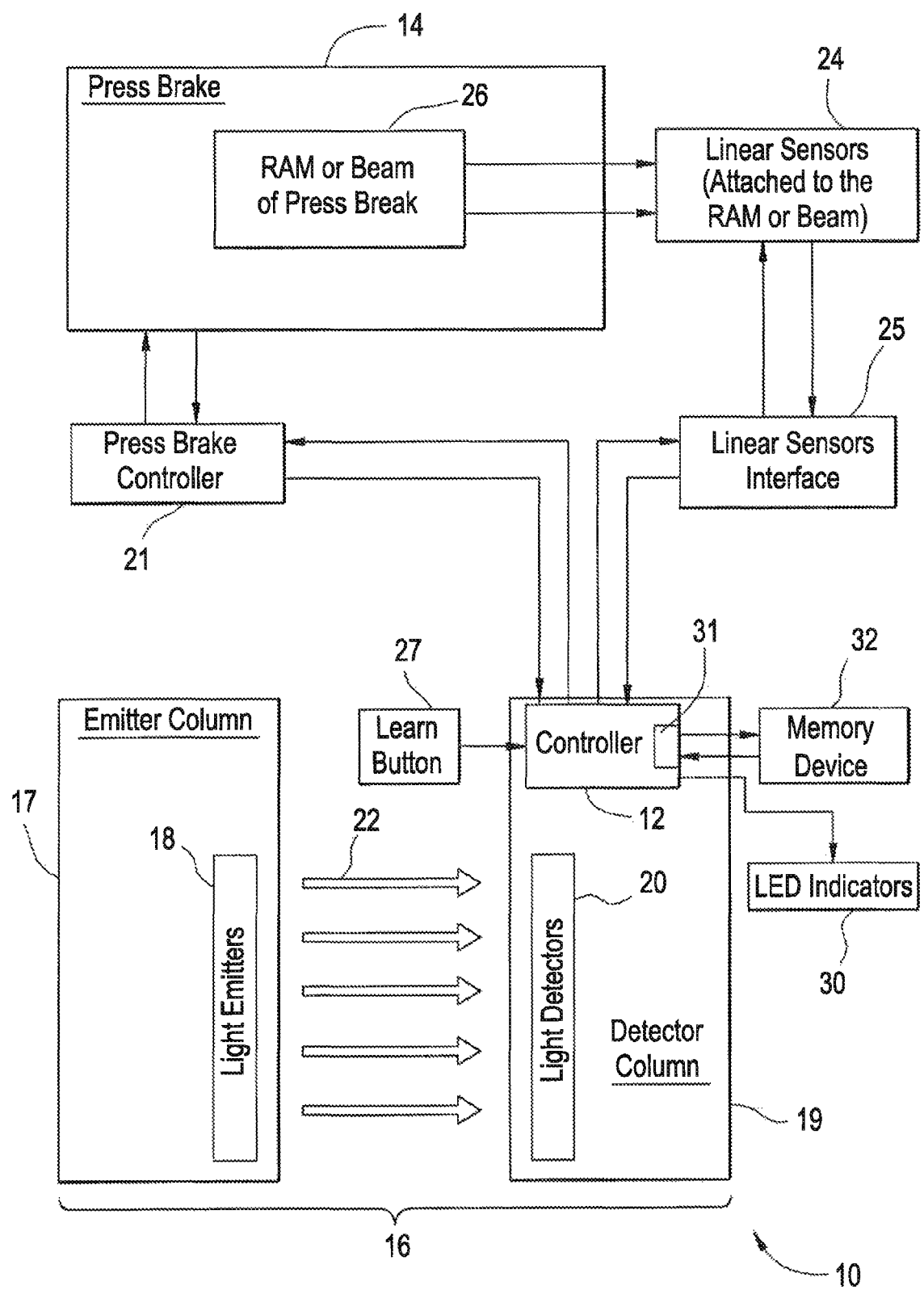
FIG. 2 is similar to FIG. 1, but illustrates a more specific embodiment.

As shown in FIG. 1, the light curtain 10 preferably includes at least one presence detector 16 which is connected to the controller 12. The at least one presence detector 16 may comprise, for example as shown in FIG. 2, an emitter column 17 comprising a plurality of light emitters 18 and a corresponding detector column 19 comprising a plurality of light detectors 20 (as well as preferably the controller 12). In use, the columns 17, 19 are spaced apart proximate the machine 14, and the light emitters 18 are controlled such that they emit beams of light (as indicated with arrows 22 in FIG. 2) toward the light detectors 20. When the light detectors 20 detect a break in the light beams 22, the light curtain controller 12 preferably signals a controller 21 of the machine 14 to stop moving a movable part 26 of the machine 14. As such, during operation of the machine 14, if the operator sticks a limb between the columns 17, 19 such that the light beams 22 break, the controller 12 of the light curtain 10 signals the controller 21 of the machine 14 to stop movement of the machine 14, thereby possibly preventing injury to the operator.

Preferably, the controller 12 is configured such that the at least one presence detector 16 is effectively programmable. For example, where the at least one presence detector 16 comprises an emitter column 17 comprising a plurality of light emitters 18 and a corresponding detector column 19 comprising a plurality of light detectors 20, preferably the controller 12 operates the detector column 19 such that during certain stages of the process with which the machine 14 is being used, certain light beams 22 or portions of the columns 17, 19 are effectively deactivated such that if an object, such as the part which is being processed, is positioned or comes between the columns 17, 19 at that or those locations, the machine 14 continues to operate. As such, preferably the light curtain 10 comprises a sequentially programmable beam-blank-out system.

Preferably, in addition to the at least presence detector 16, the light curtain also comprises at least one machine sensor 24 which is configured to sense the position and/or speed of movement of a moveable part of the machine. This at least one sensor 24 is connected to the controller 12 of the light curtain 10, and the controller 12 is configured to receive feedback from the at least one presence detector 16 as well as from the at least one sensor 24 which is configured to sense the position and/or speed of movement of a moveable part of the machine 14. The controller 12 of the light curtain 10 is configured to signal the controller 21 of the machine 14 to operate the machine 14 based on the feedback which is received by the light curtain 10.

Specifically, preferably the controller 12 is configured to operate the at least one presence detector 16 to define a blanked-out area, and the controller 12 signals the controller 21 of the machine 14 to slow a moveable part 26 of the machine 14 as the movable part of the machine 14 moves through the blanked-out area. In other words, the light curtain 10 is configured such that the at least one presence detector 16 can be operated such that it is acceptable that, while processing a part using the machine 14, the at least one presence detector 16 senses, for example, the part. However, as a moveable part 26 of the machine, such as the ram or beam 26 of a press brake as shown in FIG. 2, moves through this area, the controller 12 signals the controller 21 of the machine 14 to operate the machine 14 such that the moveable part 26 moves more slowly, thereby lowering the risk of substantial injury.

With regard to the at least one sensor 24 which is configured to sense the position and/or speed of movement of a moveable part of the machine, the at least one sensor can comprise, for example, at least one linear position sensor such as at least one SIL 3 certified sensor, or at least one linear encoder. Regardless, the at least one sensor 24 is configured to effectively track the position and/or speed of a moveable part 26 of the machine 14. Preferably, when the movable part of the machine 14 enters a blanked-out area (as defined by the sequentially programmable nature of the at least one presence detector 16), the controller 12 signals the controller 21 of the machine 14 to operate the machine 14 such that the moveable part 26 of the machine 14 moves more slowly than when the movable part 26 of the machine 14 is moving through a non-blanked out area. As shown in FIG. 2, a sensor interface 25 may be provided between the controller 12 and the sensor(s) 24.

As shown in FIG. 2, the machine 14 may comprise a press brake, and the at least one sensor 24 may comprise at least one linear position sensor or linear encoder which is located on the beam or ram 26 of the press brake. The at least one presence detector 16 may comprise a pair of columns 17, 19 which are mounted relative to the press brake 14 such that the columns 17, 19 effectively detect when something comes between the columns 17, 19, and breaks the light beams 22, during operation of the press brake 14. Preferably, the columns 17, 19 are such that they are sequentially programmable, such that it is acceptable for something (such as the part being processed) to come between certain areas ("blanked-out areas") of the columns 17, 19, and break some of the beams 22, during certain times during the process of forming a part. When the ram 26 of the press brake 14 moves through a blanked-out area, the controller 12 of the light curtain 10 preferably signals the controller 21 of the machine 14 to move the ram 26 at a safer, slower speed than when the ram 26 is being moved through a non-blanked-out area.

Preferably, the programmable sequential blanking allows a supervisor to configure the light curtain 10 with a sequence of fixed monitored blanking patterns which correspond to each step of a part fabrication process. Preferably, the controller 12 is configured such that the light curtain 10 effectively learns these patterns directly from a supervised part processing cycle. Specifically, the light curtain 10 may be provided with a "learn button" 27 or some other user interface which can be activated by the operator, and then the operator operates the machine 14 once to fabricate a part, with all the presence detectors 16 functioning. During operation, the light curtain 10 learns when certain presence detectors 16 (such as which light beams 22 of the columns 17, 19) need to be blanked-out during the process for the part to be fabricated. Subsequently, during normal operation, a machine operator is forced to follow safe operation procedures previously defined by the supervisor. During the programming procedure performed by the supervisor, the light curtain 10 also preferably uses the at least one machine sensor 24 to effectively mark the top and bottom dead ends of the stroke of the machine 14 for each job step. When set into run mode (i.e., normal operation), the light curtain 10 loads the blanking pattern corresponding to the first step in the job.

Preferably the blanking pattern is fully monitored, such that the controller 12 signals the controller 21 of the machine 14 to stop moving the moveable part 26 of the machine 14 until the blanking pattern is satisfied by the part. Once the part has been properly positioned (i.e., the blanking is satisfied), and the remaining part of the protective field is clear, the controller 12 of the light curtain 10 allows the operator to use the controller 21 of the machine 14 to operate the machine 14 such that the moveable part 26 of the machine 14 moves and interacts with the part (such as by performing a bending cycle). During the closing stroke of the moveable part 26 of the machine 14 (such as the closing stroke of the ram 26 of a press brake), and regardless of its speed, any obstruction of the protective field 22 (other than the blanked-out areas) causes the controller 12 of the light curtain 10 to signal the controller 21 of the machine 14 to stop moving the moveable part 26 of the machine 14. Preferably, during operation of the machine 14, the light curtain 10 uses the at least one sensor 24 to determine the cycle progress and position. Finally, once the moveable part of the machine 14 has stopped at the predetermined top dead end of the current cycle, the light curtain 10 preferably loads the blanking pattern corresponding to the next bending step so that the operator can continue with the part processing. This sequence is repeated until the part processing is completed.

In order to protect the operator against the risks associated with the intrusion of limbs behind the shadow created by the part being in blanked-out areas, the light curtain 10 includes a slow speed command output to force the machine 14 into safe speed mode whenever the hazardous part of the machine 14 enters the blanked-out area. Position feed-back speed signals are read from the at least one sensor 24 (such as linear encoders) attached to the moveable part 26 of the machine 14, and since the light curtain 10 knows the size of the blanked-out area and also the top and bottom dead end positions of the moveable part of the machine 14 for each processing step (such as for each bending step of a press brake), the light curtain 10 can determine in real-time the actual position of the moveable part of the machine 14 in relation to the blanked-out area. As soon as the moveable part of the machine 14 approaches the boundaries of the blanked-out area, the light curtain 10 signals the machine 14 (i.e., its controller 21) to go into slow speed mode while it continues using the at least one sensor 24 to monitor the position and speed of the moveable part 26 of the machine 24.

The controller 12 of the light curtain may be configured such that the light curtain 10 can operate in different modes. For example, the light curtain 10 may be configured such that it can be set to operate in stop mode, during which the light curtain 10 is configured to signal the controller 21 to stop moving the moveable part of the machine 24 when the moveable part of the machine 24 enters a blanked-out area. The light curtain 10 could be configured such that, at this point in time when the moveable part of the machine 24 has stopped, another controller takes over operation of the machine 14 (without intervention of the light curtain 10) and makes the moveable part of the machine 14 move in a slow speed mode through the blanked-out area. The light curtain 10 may be configured such that the operator has to press-and-hold one or more levers, etc., while the moveable part of the machine 14 moves slowly through the blanked-out area(s). Preferably, the light curtain 10 is configured such that a failure to meet maximum safe speed requirements before entering the blanked-out area will result in the controller 12 of the light curtain 10 signaling the controller 21 of the machine 14 to control the machine 14 such that the moveable part of the machine 14 stops moving.

The light curtain 10 may be configured such that it can be set to operate in small parts mode, during which the sequential blanking function of the at least one presence detector 16 is not used and the whole protective field (as defined by the at least one presence detector 16) must be completely clear to start a cycle of the machine 14. During the cycle, preferably the light curtain 10 uses the at least one machine sensor 24 to monitor the position of the moveable part of the machine 14, and once the moveable part of the machine 14 reaches a predefined position, the controller 12 signals the controller 21 of the machine 14 to stop moving the moveable part 26 of the machine 14. Similar to the stop mode discussed above, the light curtain 10 could be configured such that when the moveable part of the machine 14 has stopped, another controller takes over operation of the machine (without intervention of the light curtain 10) and makes the moveable part of the machine 14 move in a slow speed mode through the blanked-out area.

Preferably, the light curtain 10 is configured such that it has a Safe by Speed and Position Function (SSP). In other words, preferably the light curtain 10 is configured such that it effectively monitors the safety of the machine in a comprehensive fashion, using information received not only from the at least one presence detector 16, but also from the machine sensor 24 in order to determine the position and speed of a moveable part of the machine 14. This allows the light curtain 10 to avoid stopping the moveable part of the machine 14 unnecessarily, even when, under proper conditions, the at least one presence detector 16 has detected something outside the existing blanked-out area or the blanking pattern has not been satisfied. For example, the light curtain 10 can be configured to keep moving the moveable part of the machine: when a die opening is less than 6 mm; when the moveable part of the machine is moving slower than a pre-determined speed (such as 10 millimeters per second); and/or when the moveable part of the machine is moving in an opening direction (i.e., in a direction which is not typically associated with injury to the operator). These are just a few examples.

The light curtain 10 can be configured such that a blanking tolerance can be assigned to each job to aid in those cases where the work-piece cannot be precisely positioned due to vibration, poor handling or physical limitations of the work-piece itself (e.g., as a result of flexing and twisting of large sheet metal parts, in the situation where the machine is a press brake). When using blanking tolerance, the effective size of the blanked-out area is automatically taken into account by the light curtain 10 to determine the position of the moveable part of the machine at which time the slow speed (or stop) mode must be applied.

The controller 12 of the light curtain 10 is preferably configured such that special tools or passwords are utilized to prevent unauthorized access to the configuration and programming modes of the light curtain 10 (such as to generate new jobs and store them in memory).

Preferably, the presence detectors 16 of the light curtain 10 are configured to provide some form of optical feedback to the operator to let the operator know which presence detectors are detecting presence during different steps of the part fabrication process. For example, if the at least one presence detector 16 comprises, as shown in FIG. 2, an emitter column 17 comprising light emitters 18 and a corresponding detector column 19 comprising light detectors 20, preferably an LED indicator 30 is provided for each light beam 22, which thereby allows the operator to turn his attention to the location of the misplaced part when the blanking is not satisfied.

In the case where the machine is a press brake as shown in FIG. 2, and is being used to bend metal, the light curtain 10 can be configured to provide for angled flange compensation. In some cases, the flanges of a partially bent work-piece are not horizontal, so the flange is taller at the pinch point plane than at the light curtain plane. For those cases, preferably the light curtain 10 is configured to make the machine 14 go into the slow speed mode a little before on its way down (programmed for each step or for the whole job). Preferably, this parameter is configured during the "teach mode". The detection capability may be set at 14 millimeters, and the safety distance may also be fixed at 150 millimeters (given that the press' stop time is short enough). At short safety distances such that this, any flange angle will be compensated reasonably well slowing the press to a safe speed before the point in time where the tool reaches the edge of the flange at the pinch point plane.

The controller 12 of the light curtain 10 may be configured such that the internal memory will only hold information relating to one job. Whenever a new job must be taught, the previous one is completely deleted and the new one replaces the only memory allocation available. In order to provide a way of permanently storing jobs in storage media outside the light curtain 10, a specific interface such as a port 31 (see FIG. 2) can be provided on the controller 12. This job data related port 31 preferably supports the use of removable memory devices 32, where each of them has the capability of storing one job. The identification of the job stored on the memory device 32 may be accomplished by manual labeling means and appropriate manipulation (e.g., keeping the memory device 32 attached to the corresponding work orders). Preferably, connecting the memory device 32 to the controller 12 will allow the user to upload the job stored in the memory device 32 to the system through the port 31. In order to perform the opposite operation, that is, to download the job to the memory device 32, preferably supervisory access rights are required through use of a key. Preferably, each time a job is uploaded, the light curtain 10 validates the data in order to detect any corruption, and to check the correspondence between the configuration/set-up of the job being uploaded and that of the receiving system (number of presence detectors 16 present, etc.).

The light curtain 10 preferably provides several outstanding safety features, such as: the light curtain is only blanked-out during those processing steps (such as bending steps) that really need it, and all blanking patterns are fully monitored; the operator is forced to place the part in the exact same position defined during the creating of the job program, and the operator is prevented from initiating a new cycle if he misses a step (i.e., the blanking pattern is not fulfilled); and motion of the moveable part of the machine inside the blanked-out area is always performed at a safe speed, and any failure that leads to a fast movement is detected and the machine 14 stopped.

Additionally, preferably the light curtain 10 offers many productivity advantages, such as but not limited to: the use of slow speed mode is minimized and used only when needed, thus increasing the throughput of the machine 14; the light curtain 10 can be employed in applications using multiple tools of different heights at the same time; and multiple jobs can be programmed and stored, thereby reducing set-up times.

Preferably, the light curtain 10 is configured such that it is certifiable under one or more industry standards, such as EN 12622:2010, ISO 13849, IEC 61496-1, IEC 61496-2 and IEC 61508. As a result of not only including at least one presence detector 16, but also at least one machine sensor 24 which effectively monitors the machine 14 itself, the light curtain 10 preferably effectively provides safety features in the form of safety distance safeguarding, safe speed safeguarding, and position monitoring.

Above, it has been discussed that at times the movable part of the ram is caused to move more slowly. It should be pointed out that the speed at which the ram is caused to move is preferably predetermined as required by applicable standards.

While each of FIGS. 1 and 2 illustrate a light curtain which is in accordance with an embodiment of the present invention, FIG. 3 illustrates a method which is in accordance with an embodiment of the present invention. FIG. 3 is self-explanatory given the foregoing discussion relating to the light curtains shown in FIGS. 1 and 2.

While specific embodiments of the invention have been shown and described, it is envisioned that those skilled in the art may devise various modifications without departing from the spirit and scope of the present invention.

What is claimed is:

1. A light curtain which is configured for use with a machine, said light curtain comprising: a controller which is communicatingly connected to a controller of the machine; at least one presence detector which is connected to the controller of the light curtain; at least one machine sensor which is configured to sense at least one of position and speed of movement of a movable part of the machine, wherein the controller of the light curtain is configured to receive feedback from the at least one presence detector as well as from the at least one sensor which is configured to sense at least one of position and speed of movement of the movable part of the machine, and wherein the controller of the light curtain is configured to signal the controller of the machine to operate the machine based on the feedback which is received by the light curtain, wherein the controller of the light curtain is programmable to define at least one blanked out area relating to the at least one presence detector, wherein the machine sensor detects when the machine is entering the at least one blanked our area without regard to what is being sensed by the at least one presence detector, and the controller of the light curtain thereafter communicates to the controller of the machine to slow movement of the machine while the machine sensor detects the machine in the at least one blanked out area and while the at least one presence detector continues to detect a presence of something other than a moveable part of the machine.

2. A light curtain as recited in claim 1, wherein the at least one presence detector comprises a plurality of light emitters and a plurality of light detectors, wherein the light emitters are configured to emit beams of light toward the light detectors.

3. A light curtain as recited in claim 2, wherein the controller of the light curtain is configured to deactivate some of the light detectors during operation of the machine.

4. A light curtain as recited in claim 1, wherein the controller of the light curtain comprises a computer running computer readable code.

5. A light curtain as recited in claim 1, wherein the at least one sensor which is configured to sense at least one of position and speed of movement of the movable part of the machine comprises at least one linear position sensor.

6. A light curtain as recited in claim 1, wherein the at least one sensor Which is configured to sense at least one of position and speed of movement of the movable part of the machine comprises at least one linear encoder.

7. A light curtain as recited in claim 1, wherein the controller of the light curtain is configured to operate the at least one presence detector such that at least a portion of the at least one presence detector is deactivated during operation of the machine.

8. A light curtain as recited in claim 1, wherein the controller of the light curtain is configured to operate the at least one presence detector to define a blanked-out area, and wherein the controller of the light curtain is configured to signal the controller of the machine to slow the movable part of the machine as the movable part of the machine moves through the blanked-out area.

9. A light curtain as recited in claim 1, wherein the at least one sensor which is configured to sense at least one of position and speed of movement of the movable part of the machine comprises at least one sensor disposed on at least one of a ram and a beam of the machine.

10. A light curtain as recited in claim 1, wherein the controller of the light curtain is configured to be placed in teaching mode, during which time the machine processes a part, and the controller of the light curtain learns blanking patterns associated with the at least one presence detector.

11. A method of changing operation of a machine, said method comprising: providing a light curtain; programming the light curtain to define at least one blanked-out area of the machine relating to at least one presence detector of the light curtain; using a machine sensor separate from the at least one presence detector to detect when the machine is entering the at least one blanked out area, without regard to what is being sensed by the at least one presence detector, and thereafter having a controller of the light curtain communicate to the controller of the machine to slow movement of the machine while the machine sensor detects the machine in the at least one blanked out area and while the at least one presence detector continues to detect a presence of something other than a moveable part of the machine.

12. A method as recited in claim 11, wherein the step of providing a light curtain comprises providing a controller which is communicatingly connected to a controller of the machine, providing at least one presence detector which is connected to the controller of the light curtain, providing at least one sensor which is configured to sense at least one of position and speed of movement of the movable part of the machine, wherein the controller of the light curtain is configured to receive feedback from the at least one presence detector as well as from the at least one sensor which is configured to sense at least one of position and speed of movement of the movable part of machine, and wherein the controller of the light curtain is configured to signal the controller of the machine to operate the machine based on the feedback which is received by the light curtain.

13. A method as recited in claim 12, wherein the step of providing at least one presence detector comprises providing a plurality of light emitters and providing a plurality of light detectors, wherein the light emitters are configured to emit beams of light toward the light detectors.

14. A method as recited in claim 12, wherein the step of providing at least one sensor comprises providing at least one linear position sensor.

15. A method as recited in claim 14, wherein the step of providing at least one linear position sensor comprises providing at least one SIL 3 certified sensor.

16. A method as recited in claim 12, wherein the step of providing at least one sensor comprises providing at least one linear encoder.

17. A method as recited in claim 12, further comprising operating the at least one presence detector such that at least a portion of the at least one presence detector is deactivated during operation of the machine.

18. A method as recited in claim 12, further comprising deactivating some of the light detectors during operation of the machine.

19. A method as recited in claim 12, further comprising operating the at least one presence detector to define a blanked area, and causing the machine to be operated such that the moveable part of the machine slows down as the moveable part moves through the blanked area.

\* \* \* \* \*